United States Patent
Hsin et al.

(10) Patent No.: US 10,101,817 B2
(45) Date of Patent: Oct. 16, 2018

(54) DISPLAY INTERACTION DETECTION

(71) Applicant: Intel Corporation, Santa Clara, CA (US)

(72) Inventors: Chih-Fan Hsin, Portland, OR (US); David L. Graumann, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 14/636,247

(22) Filed: Mar. 3, 2015

(65) Prior Publication Data

US 2016/0259418 A1 Sep. 8, 2016

(51) Int. Cl.
| | |
|---|---|
| *G06F 3/01* | (2006.01) |
| *G06F 3/0488* | (2013.01) |
| *G06F 3/041* | (2006.01) |
| *G06F 3/042* | (2006.01) |
| *G06K 9/00* | (2006.01) |
| *H04N 5/33* | (2006.01) |
| *H04N 5/235* | (2006.01) |

(52) U.S. Cl.
CPC ............ *G06F 3/017* (2013.01); *G06F 3/0418* (2013.01); *G06F 3/0421* (2013.01); *G06F 3/04883* (2013.01); *G06K 9/00335* (2013.01); *G06K 9/00375* (2013.01); *H04N 5/2354* (2013.01); *H04N 5/33* (2013.01); *G06T 2207/10028* (2013.01); *G06T 2207/10048* (2013.01)

(58) Field of Classification Search
CPC .................................................. G06F 3/04883
See application file for complete search history.

(56) References Cited

U.S. PATENT DOCUMENTS

| | | | |
|---|---|---|---|
| 8,515,128 B1 | 8/2013 | Hildreth | |
| 2002/0021287 A1* | 2/2002 | Tomasi | G06F 1/1613 345/168 |
| 2007/0165305 A1* | 7/2007 | Mehrle | G02B 27/2214 359/464 |
| 2008/0006762 A1* | 1/2008 | Fadell | G01J 1/4204 250/201.1 |
| 2011/0050649 A1 | 3/2011 | Newton et al. | |

(Continued)

FOREIGN PATENT DOCUMENTS

WO    WO 2014106210 A1 *    7/2014    ........... H04N 5/2176

OTHER PUBLICATIONS

Hsin et al., U.S. Appl. No. 14/225,941, filed Mar. 26, 2014, US Application, Drawings, and Filing Receipt dated Apr. 18, 2014 attached (37 pages), not yet published.

(Continued)

*Primary Examiner* — Anner N Holder
(74) *Attorney, Agent, or Firm* — International IP Law Group P.L.L.C.

(57) ABSTRACT

Techniques for interaction detection are described herein. The techniques may include detecting, via a depth sensing module, a physical object at a plane of a display. The techniques may also include detecting, via the depth sensing module, a reflection of the physical object at the plane of the display. An interaction module may identify an interaction of the physical object with the display based on a meeting point of the detected physical object and the detected reflection.

26 Claims, 7 Drawing Sheets

(56) References Cited

U.S. PATENT DOCUMENTS

| | | | | |
|---|---|---|---|---|
| 2011/0291988 | A1* | 12/2011 | Bamji | G06F 3/0428 345/175 |
| 2011/0304589 | A1* | 12/2011 | Yoshida | G06F 3/0416 345/175 |
| 2013/0257811 | A1* | 10/2013 | Usuda | G06F 3/0425 345/175 |
| 2013/0278499 | A1* | 10/2013 | Anderson | G06F 3/01 345/156 |
| 2015/0080021 | A1* | 3/2015 | Bietz | H04B 1/3877 455/456.1 |
| 2015/0373262 | A1* | 12/2015 | Georgiev | G03B 17/17 348/218.1 |

OTHER PUBLICATIONS

International Search Report, PCT No. PCT/US2016/015967, dated Jun. 1, 2016, 3 pages.

* cited by examiner

200

300

DISPLAY INTERACTION DETECTION

TECHNICAL FIELD

This disclosure relates generally to display interaction detection. More specifically, the disclosure describes detection of an interaction at a display via depth sensing.

BACKGROUND

Computing devices increasingly include touch sensing capabilities, such as touch screens or touch interfaces. Increasingly, touch sensitive displays are expected by users. However, some displays are not configured with touch sensing capabilities. In some cases, touch sensing capabilities on larger sized displays may be cost prohibitive.

DETAILED DESCRIPTION

The subject matter disclosed herein relates to techniques for touch sensing capability using depth sensing. A touch surface may be implemented by various systems including imaging devices configured to detect an interaction at a display surface. However, in some cases, a field of view of a given imaging device may be occluded by an interacting object. The techniques described herein include a depth sensing module configured to project light at, or near, a plane of a display. The depth sensing module may also include an image sensor configured with a field of view including the area of the projected light. When an object such as a hand appears in the field of view of the image sensor, the image sensor may capture the light reflected off of the hand as well as the reflection onto a surface of the display. A meeting point between a portion of the hand, such as a finger, and the reflection of that portion on the surface of the display may be used to identify the interaction point. This meeting point between an object at or near the surface and the reflection of that object on the surface may increase interaction identification fidelity, as well as increase location identification fidelity of the interaction.

The depth sensing module may include an infrared emitter to project light, as discussed above. In some cases, the depth sensing module may employ structured light wherein a known pattern of pixels (often grids or horizontal bars) are projected on to a scene. In some cases, the depth sensing module may employ time of flight cameras wherein a light pulse or pulses, have predetermined delays, and wherein a difference in time of flight may be used to determine distance, or, in other words depth. Other types of depth sensing may be employed. The depth sensing module may be disposed on an edge of the display such that occlusion by the object itself from the image sensor may be reduced. As discussed in more detail below, the techniques described herein may also include one or more visible light image sensors configured to capture images in a different spectrum than the image sensor of the depth sensing module. The visible light sensors may increase fidelity of both location and interaction identification, as well as reduce errors related to occlusion of another object within a field of view of the visible light sensors.

Figure 1:
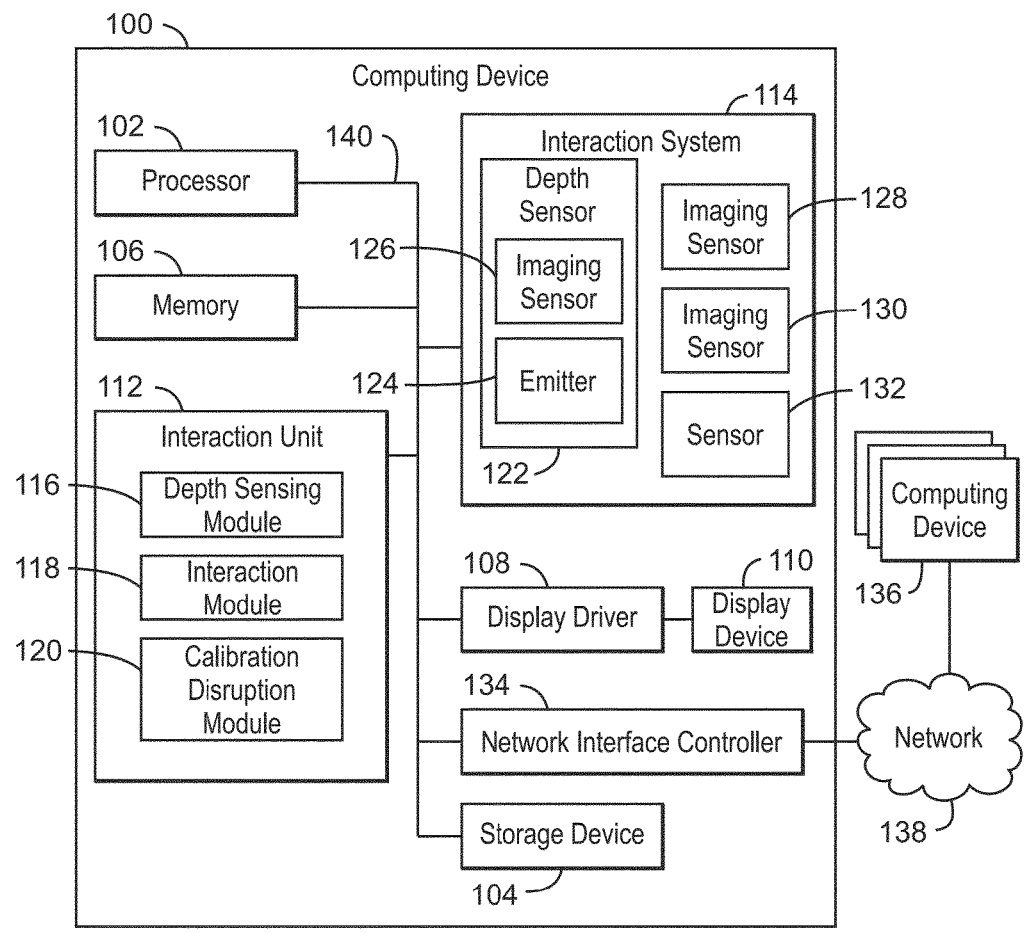
FIG. 1 is a block diagram of a computing device having an interaction system to identify interaction at the computing device.

FIG. 1 is a block diagram of a computing device having an interaction system to identify interaction at the computing device. The computing device 100 may include a processor 102, a storage device 104 that may include a non-transitory computer-readable medium, and a memory device 106. The computing device 100 may include a display driver 108 configured to operate a display device 110 to render images at a graphical user interface (GUI), an interaction unit 112 configured to operate in conjunction with an interaction system 114. As discussed in more detail below, the interaction unit 122 may be implemented as logic, at least partially comprising hardware logic, such as electronic circuitry, as software implementable by a processing device, such as the processor 102, or any combination thereof. The interaction system 114, as discussed in more detail below includes one or more hardware components configured to capture depth sensing image data.

The computing device 100 includes modules of the interaction unit 112 configured to detect an object near or at a plane of the display device 110. The interaction unit 112 may be a processing unit, computer readable instructions to be carried out by the processor 102, or any other electronic logic, microprocessor, and the like configured to carry out operations of modules discussed in more detail below. Further, in some cases the interaction unit 112 may be integrated with the interaction system 114.

The modules of the interaction application 112 may include a depth sensing module 116, an interaction module 118, and a calibration disruption module 120. The modules 116, 118, and 120 may be logic, at least partially comprising hardware logic. In some examples, the modules 116, 118, and 120 may be instructions stored on a storage medium configured to be carried out by a processing device, such as the processor 102. In yet other examples, the modules 116, 118, and 120 may be a combination of hardware, software, and firmware. The modules 116, 118, and 120 may be configured to operate independently, in parallel, distributed, or as a part of a broader process. The modules 116, 118, and 120 may be considered separate modules or sub-modules of a parent module. Additional modules may also be included. In any case, the modules 116, 118, and 120 are configured to carry out operations.

The modules 116, 118, and 120 of the interaction application 112 may be configured to detect interaction indicated by outputs including depth data from one or more devices of the interaction system 114. For example, the interaction system may include a depth sensor 116. The depth sensor 122 may include an emitter 124 and an imaging sensor 126. The emitter 124 may project light configured to reflect off of any object within a field of projection associated with the emitter 124. The imaging sensor 126 may capture the reflected light of the object, as well as light reflected off of the object and onto a surface of the display device 110. Based on a distortion of the projected light captured by the imaging sensor 126, a distance of the object with respect to the depth sensor 122 may be determined. Further, a meeting point of the object and the light reflected from the object onto the surface of the display device 110 that is captured by the imaging sensor 126 may be identified by the interaction module 118. Accordingly, the depth sensor 122 may capture data indicating an identification of an interaction with the surface of the display as well as data indicating a location of the interaction.

In embodiments, the interaction system 114 may include additional imaging sensors 128 and 130. The imaging sensors 128 and 130 may be integrated as a part of the depth sensor 122 or may be discrete components. In any case, the imaging sensors 128 and 130 may be configured to capture light in a different spectrum than the imaging sensor 126 of the depth sensor 122. For example, the imaging sensor 126 may be configured to capture infrared light projected by the emitter 124, while the imaging sensors 128 and 130 may red-blue-green (RGB) imaging sensors configured to capture visible light. The imaging sensors 128 may enhance the identification of an interaction as well as detection of depth, or location, of the interaction. For example, in some cases, the reflection of projected light associated with the depth sensor 122 may be saturated by ambient light in an environment, by the light transmitted by the display device 110, and the like. In this scenario, one or more of the imaging sensors, such as the imaging sensor 128, may be used to capture the object within a field of view of the imaging sensor 128 as well as the reflection of the object on the surface of the display device 110. Further, in the case of two or more imaging sensors, such as imaging sensors 128 and 130, triangulation may be used by comparing images captured of the object and the object's reflection from different positions to determine location. In either case, the imaging sensors 128 and 130 may use visible light capture to enhance fidelity of interaction identification as well as interaction location. The techniques described herein may enable a display device, such as the display device 110 that does not have a native touch screen functionality to interact with objects, such as a user, in a touch screen manner.

The location detection discussed above may be dependent upon a position of the depth sensor 122, the imaging sensors 128 and 130, or any combination thereof. Movement of the display device 110 or any of the sensors 122, 128, or 130 may disrupt the calibration. Accordingly, in some embodiments, the interaction unit 112 may include a calibration disruption module 120 configured to detect movement indicated by a sensor 132. For example, the sensor 132 may be an accelerometer configured to determine if any components of the interaction system have experienced movement. As another example, the sensor 132 may store locations or relative locations of one or more of the sensors 122, 128, and 130 and report changes to the calibration disruption module 120. The calibration module 120 may, in some cases, recalibrate based on the reported locations based on a difference in previous locations. As another example, the calibration disruption module 120 may be configured to prompt the user via the GUI at the display device 110 to assist in recalibration of the sensors 122, 128, and/or 130.

In embodiments, the computing device 100 includes a network interface controller 134 component configured to connect the computing device 100 to remote computing devices 136 via a network 138. In some scenarios, the network interface controller 134 is an expansion card configured to be communicatively coupled to a system bus 140. In other scenarios, the network interface controller 134 may be integrated with a motherboard of a computing device, such as the computing device 100. In embodiments, the interaction unit 112 may be carried out, and/or stored on, a remote computing device, such as one of the remote computing devices 136. For example, images captured and depth information can be sent to remote computing devices 136, such as servers having an interaction unit similar to the interaction unit 112. The interaction identification, location detection, calibration, and the like may be provided to the computing device 100 from one or more of the remote computing devices 136 via the network 138.

The computing device 100, as referred to herein, may be a mobile computing device wherein components such as a processing device, a storage device, and a display device are disposed within a single housing. For example, the computing device 100 may be a tablet computer, a smartphone, a handheld videogame system, a cellular phone, an all-in-one slate computing device, or any other computing device having all-in-one functionality wherein the housing of the computing device houses the display was well as components such as storage components and processing components. In other cases, the computing device 100 may be a television having the components of the computing device 100. In yet other cases, components of the computing device 100 may be remotely coupled to the display device 110, and the display device 110 may be standalone unit.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

The memory device 106 can include random access memory (RAM) (e.g., static random access memory (SRAM), dynamic random access memory (DRAM), zero capacitor RAM, Silicon-Oxide-Nitride-Oxide-Silicon SONOS, embedded DRAM, extended data out RAM, double data rate (DDR) RAM, resistive random access memory (RRAM), parameter random access memory (PRAM), etc.), read only memory (ROM) (e.g., Mask ROM, programmable read only memory (PROM), erasable programmable read only memory (EPROM), electrically erasable programmable read only memory (EEPROM), etc.), flash memory, or any other suitable memory systems. The main processor 102 may be connected through the system bus 140 (e.g., Peripheral Component Interconnect (PCI), Industry Standard Architecture (ISA), PCI-Express, Hyper-Transport®, NuBus, etc.) to components including the memory 106 and the storage device 104.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
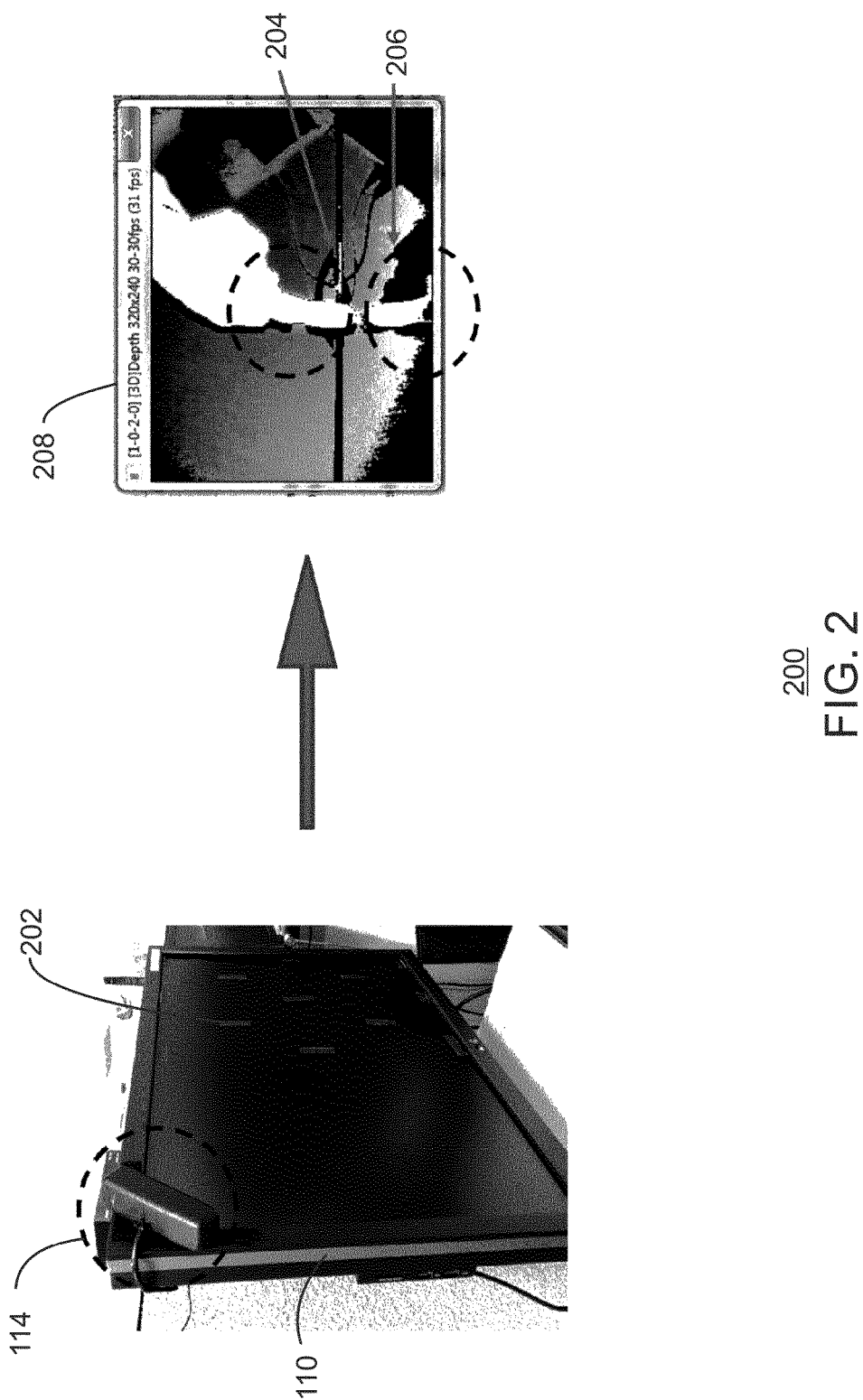
FIG. 2 is diagram illustrating an interaction system disposed on an edge of a display device and an interaction identified at a display device.

FIG. 2 is diagram illustrating an interaction system disposed on an edge of a display device and an interaction identified at a display device. An interaction system, such as the interaction system 114 of FIG. 1, is illustrated in FIG. 2 in the dashed circle. As discussed above, the interaction system 114 may include at least a depth sensor, and may, in some cases, include imaging sensors configured to capture visible light. The interaction system 114 may be disposed on an edge a display device, such as the display device 110 of FIG. 1. A field of view of the interaction system 114 may include a surface of the display device, as generally indicated by the arrow 202. When an object, such as a hand, enters the field of view of the interaction system 114, the image of at least a portion of the hand, indicated by the dashed circle 204, is captured by the interaction system 114. Further, a reflection of the hand, indicated at the dashed circle 206, is also captured by the interaction system 114. As illustrated in a GUI 208, a meeting point between the image of the hand 204 and the image of the reflection of the hand 206 indicates a point of interaction. As the interaction system 114 includes a depth sensor, such as the depth sensor 122 of FIG. 1, the interaction may be identified and a location of the interaction may be determined, as discussed in more detail below.

Figure 3:
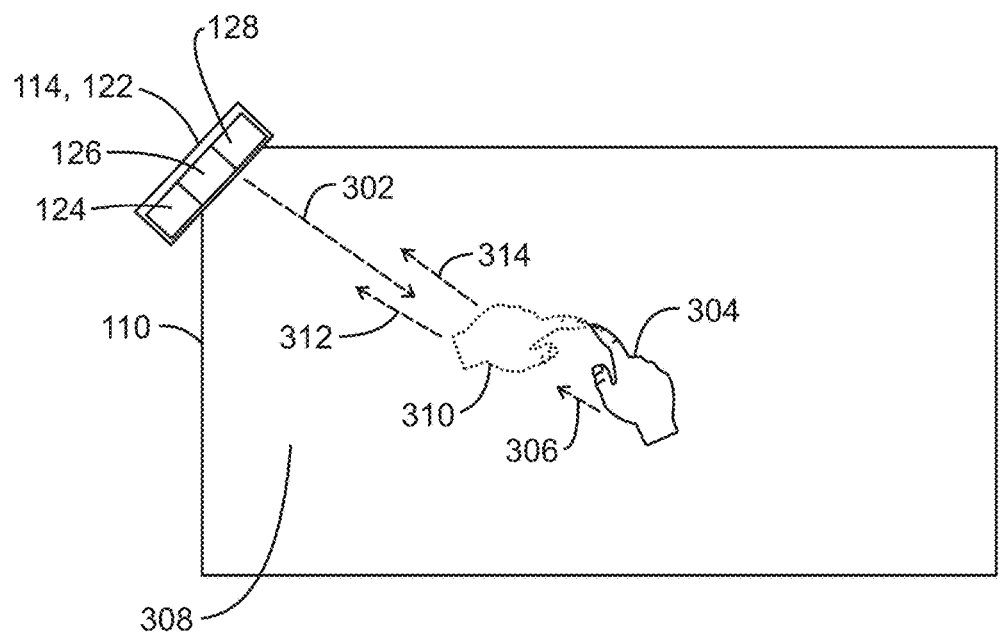
FIG. 3 is a diagram of an interaction at a display device captured by a projection and reflection of projected light.

FIG. 3 is a diagram of an interaction at a display device captured by a projection and reflection of projected light. As discussed above, the interaction system 114 includes a depth sensor (not shown). The emitter 124 of the depth sensor 122 of FIG. 1 may project light, such as an infrared beam across a field of view of the interaction system 114, as indicated at 302. The object 304 may reflect the projected light, as indicated by the arrow 306. Further, the object 304 may reflect onto a surface 308 of a display device, such as the display device 110 of FIG. 1, as indicated at 310. Both the reflection of the object 304 and the image of the reflection 310 on the surface 308 of the display device 112 may propagate back to the interaction system 114, as indicated by the arrows 312 and 314.

The reflected light may be received by an imaging sensor of the interaction system 114, such as the imaging sensor 126 of the depth sensor 122 discussed above in regard to FIG. 1. In some cases, the light projected at 302 may be structured light. Projecting structured light may include projecting a known pattern of pixels onto an object or scene. The depth or location of the meeting point between the image of the object 304 and the image of the reflected object 310 on the surface 308 may be calculated by determining a distortion of structured light when it is captured by the imaging sensor 126 of the depth sensor 122 of FIG. 1.

As discussed above in regard to FIG. 1 and in more detail below, depth information, as well as interaction identification may be further enhanced by additional sensors, such as the imaging sensor 128 and 130 of FIG. 1. For example, the imaging sensor 126 of the depth sensor 122 of FIG. 1 may be configured to detect a certain spectrum of light, such as an infrared spectrum. Other imaging sensors, such as the imaging sensor 128 may be configured to capture light in a visible light spectrum. In cases where the infrared light is saturated by external light from an environment, light from the display 110 itself, or any other type of light noise introduced, the visible spectrum may be used to validate or enhance the fidelity of interaction identification by capturing both the image of the object 304 and the reflected image of the object 310 to determine a meeting point of both images.

Figure 4:
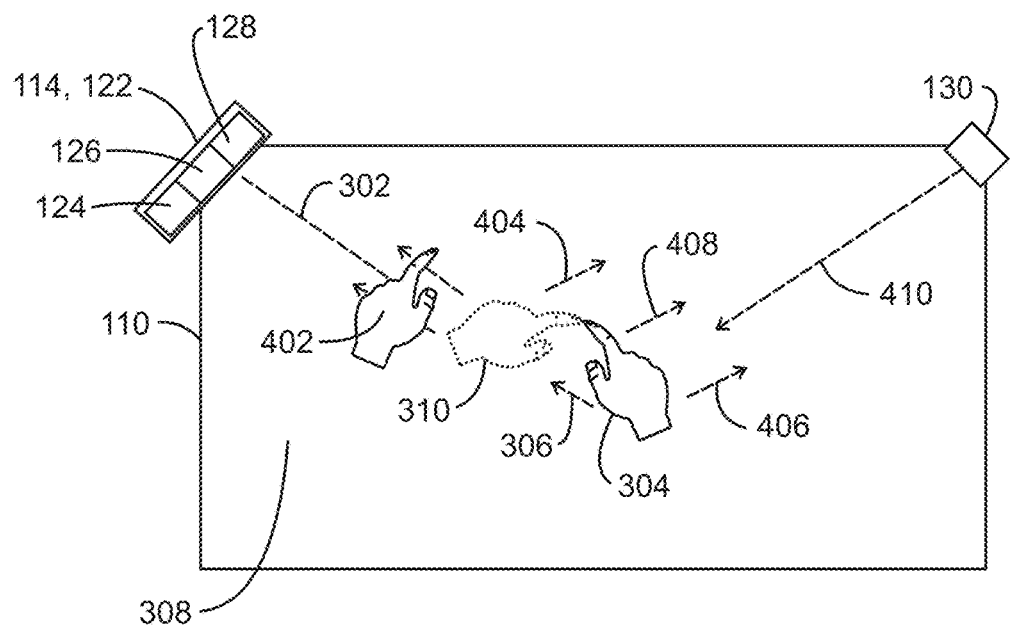
FIG. 4 is a diagram of including two depth sensors capturing an interaction at a display device captured by a projection and reflection of projected light.

FIG. 4 is a diagram of including two depth sensors capturing an interaction at a display device captured by a projection and reflection of projected light. In some cases, another object 402 may occlude image capture at the interaction system 114, as indicated in FIG. 4. In this scenario, a second image sensor, such as the imaging sensor 130 of FIG. 1, may be placed at a different location than the imaging sensor 128. An error in identifying the interaction as well as locating the interaction point that may be caused by occlusion of the second object 402 may be reduced by image capture at the second imaging sensor 130, as indicated by the arrows 404, 406, and 408. Although FIG. 4 illustrates imaging sensor 130 as a standalone component, the imaging sensor 130 may be a part of a second interaction system similar to the interaction system 114. In this scenario, light may be projected as indicated by the arrow 410, and reflected back as indicated at 404, 406, and 408.

Figure 5A:
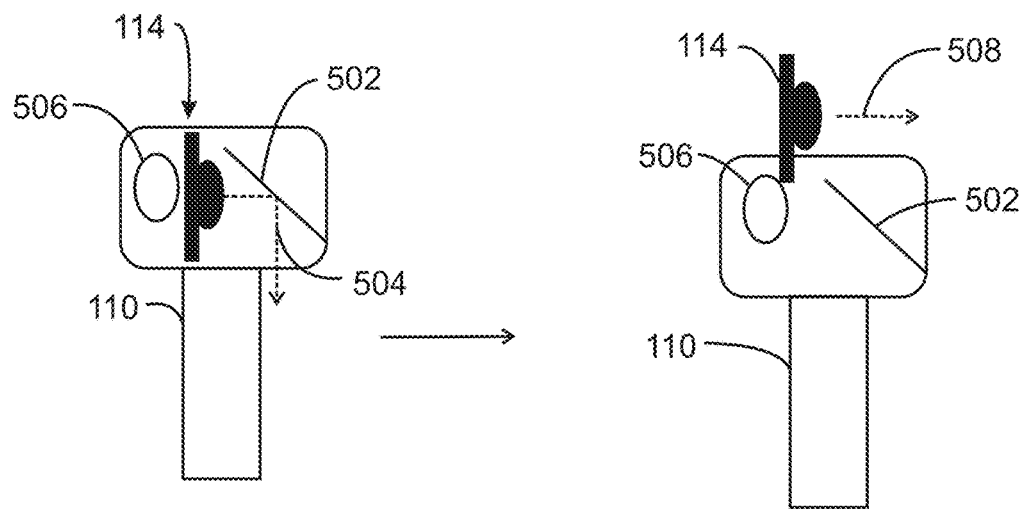
FIG. 5A is a diagram illustrating a reflective component configured to direct projection and a field of view according to one aspect.

FIG. 5A is a diagram illustrating a reflective component configured to direct projection and a field of view according to one aspect. Although in some cases, the imaging system 114 may be disposed with a field of view across, or semi-parallel to the surface of a display, such as the display 110 of FIG. 1, in other cases, the imaging system may be disposed with a field of view in the direction of propagation of the light transmitted from the display device 110, or in any other direction. For example, in many devices, such as a laptop computer, a webcam is pointed outward toward the environment. In these scenarios, a reflective component 502 may be used to selectively reflect the field of view when touch interaction is enabled.

As illustrated in FIG. 5A, the reflective component 502 may direct the field of view of image sensors of the interaction system 114, as indicated by the arrow 504. In this scenario, a motor 506 may move the interaction system 114 such that the field of view may change as indicated at 508.

Figure 5B:
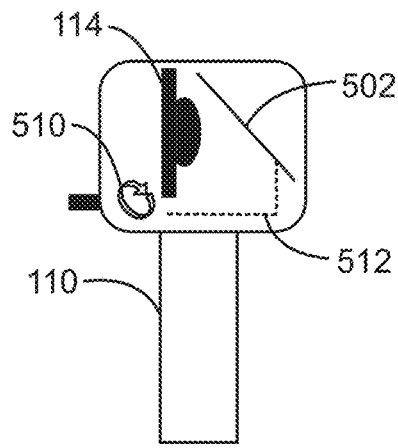
FIG. 5B is a diagram illustrating a reflective component configured to direct projection and a field of view according to another aspect.

FIG. 5B is a diagram illustrating a reflective component configured to direct projection and a field of view according to another aspect. In some cases, the reflective component 502 may be a transition metal switchable mirror. A transition metal switchable mirror may be an electroactive component capable of switching between a transparent state and a reflective state. In this scenario, electronic circuitry 510 may be coupled to the reflective component 502, as indicated at 512. During an interactive state, the reflective component 502 may transition to a reflective state. During a non-interactive state, the reflective component 502 may transition to a transparent state. The aspects described above in regard to FIG. 5A and FIG. 5B enable interactive capabilities to be implemented on a display device 110 using image sensors of the interactive system 114 that may serve other functions as well as touch interaction.

Figure 6:
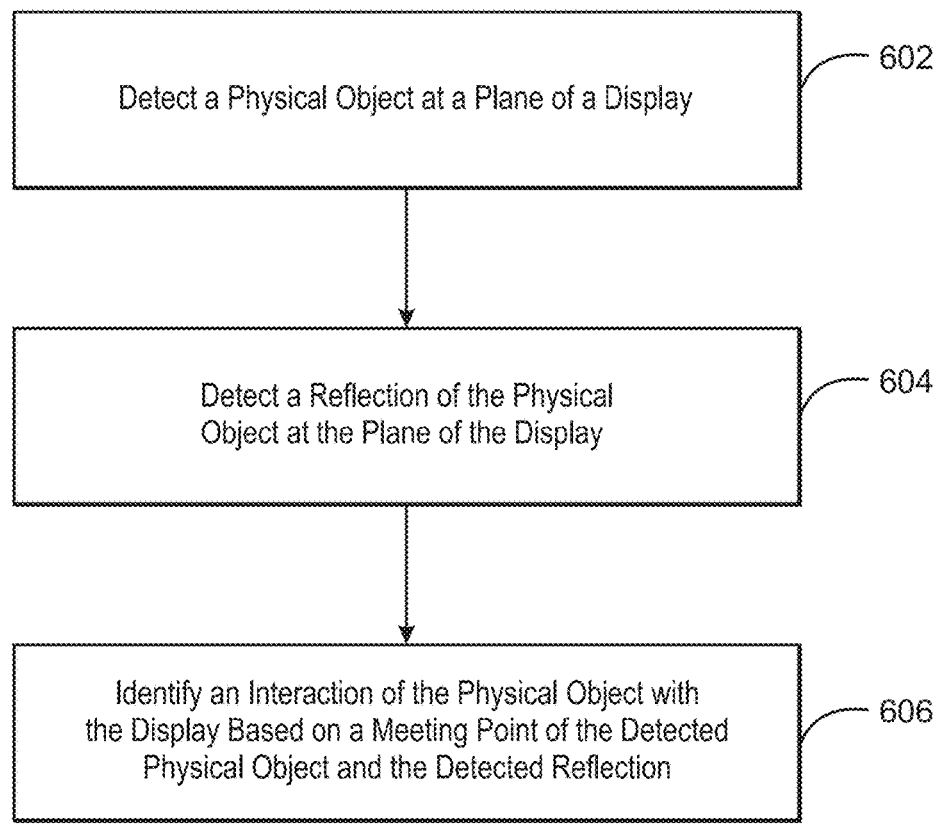
FIG. 6 is a block diagram illustrating a method for performing interaction identification.

FIG. 6 is a block diagram illustrating a method for performing interaction identification. At 602, a physical object is detected at a plane of a display. In some cases, the physical object may be detected near the plane of the display, but not at the plane. In these scenarios, hovering over a given area may enable interaction with a computing system, such as the computing device 100 of FIG. 1.

At 606, a reflection is detected of the physical object at the plane of the display. The reflection may, for example, be captured by an imaging sensor as the reflection of the object appears on a surface of the display. At 606, an interaction is identified based on whether a meeting point exists between the detected physical object and the reflection of the physical object on the surface of the display.

The method 600 may include other elements. For example, the method 600 may also include illuminating the physical object and the reflection of the physical object via an infrared projecting device, such as the emitter 124 of FIG. 1. The method 600 may also include detecting a location of the interaction with respect to the infrared emitter.

In some cases, the identification of the interaction is enhanced by a visible light sensor. The visible light sensor may detect the physical object and the reflection of the physical object in a light spectrum that is different from a light spectrum capability of the infrared emitter. The visible light sensor may also be a first visible light sensor. The method 600 may also include enhancing the location detection of the interaction by triangulation of image data captured by the first visible light sensor and image data captured by the second visible light sensor.

In some cases, the method 600 may include reducing a potential error in identifying the interaction that may be caused by an occlusion of the physical object by another physical object. In this scenario, the first and second visible light sensors are disposed at different locations such that at least one of the visible light sensors may detect the interaction and the location of the interaction. In some cases, two depth sensors may be used in the same manner to avoid error potentially caused by an occlusion.

Further, the method 600 may also include detecting movement of the infrared emitter, the first visible light sensor, the second visible light sensor, or any combination thereof. The movement detected may be used to determine if recalibration of the sensors is necessary, and may, in some cases, recalibrate based on a detected relative movement of the sensors.

In some cases, the depth sensor, the first visible light sensor, the second visible light sensor, or any combination thereof may be configured with a field of view that does not include the surface of the display. In these scenarios, the method may include directing at least a portion of the a field of view of the first visible light sensor via the reflective component, directing at least a portion of a field of view of the second visible light sensor via the reflective component, or any combination thereof, via a reflective component.

Figure 7:
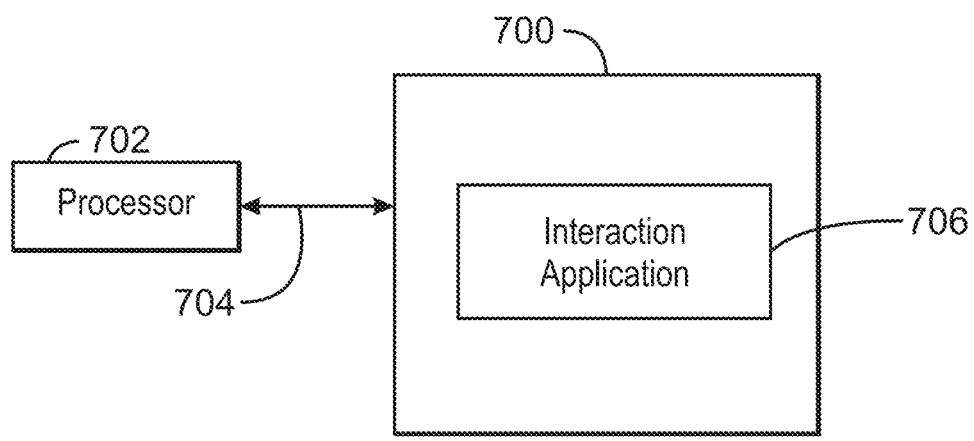
FIG. 7 is a block diagram depicting an example of a computer-readable medium configured to calibrate image capturing devices.

FIG. 7 is a block diagram depicting an example of a computer-readable medium configured to calibrate image capturing devices. The computer-readable medium 700 may be accessed by a processor 700 over a computer bus 704. In some examples, the computer-readable medium 700 may be a non-transitory computer-readable medium. In some examples, the computer-readable medium may be a storage medium, but not including carrier waves, signals, and the like. Furthermore, the computer-readable medium 700 may include computer-executable instructions to direct the processor 702 to perform the steps of the current method.

The various software components discussed herein may be stored on the tangible, non-transitory, computer-readable medium 700, as indicated in FIG. 7. For example, an interaction application 706 may be configured to detect a physical object at a plane of a display, and identify an interaction of the physical object with the display based on a meeting point of the detected physical object and the detected reflection.

Examples may include subject matter such as a method, means for performing acts of the method, at least one machine-readable medium including instructions that, when performed by a machine cause the machine to performs acts of the method, or of an apparatus or system for projecting a virtual image according to embodiments and examples described herein.

Example 1 is a system, comprising one or more modules at least partially comprising hardware logic. The wireless charging device may include a depth sensing module to: detect a physical object at a plane of a display, detect a reflection of the physical object at the plane of the display an interaction module to identify an interaction of the physical object with the display based on a meeting point of the detected physical object and the detected reflection.

Example 2 includes the system of example 1. The depth sensing module may include an infrared emitter configured to: illuminate the physical object and the reflection of the physical object, and detect a location of the interaction with respect to the infrared emitter.

Example 3 includes the system of any combination of examples 1-2. This example includes a visible light sensor to enhance the identification of the interaction by detecting the physical object and the reflection of the physical object in a light spectrum that is different from a light spectrum capability of the infrared emitter.

Example 4 includes the system of any combination of examples 1-3. The visible light sensor is a first visible light sensor. This example includes a second visible light sensor to enhance location detection of the interaction by triangulation of image data captured by the first visible light sensor and image data captured by the second visible light sensor.

Example 5 includes the system of any combination of examples 1-4. The first visible light sensor and the second visible light sensor are configured to be disposed at different locations at an edge of the display.

Example 6 includes the system of any combination of examples 1-5. The first and second visible light sensors are configured to reduce a potential error in identifying the interaction caused by an occlusion of the physical object by another physical object.

Example 7 includes the system of any combination of examples 1-6. This example includes a calibration disruption module configured to detect movement of the infrared emitter, the first visible light sensor, the second visible light sensor, or any combination thereof.

Example 8 includes the system of any combination of examples 1-7. The display is configured to emit light in a direction of propagation, and wherein the depth sensor, the first visible light sensor, the second visible light sensor, or any combination thereof, are configured to face the direction of propagation of light emitted from the display.

Example 9 includes the system of any combination of examples 1-8. This example includes a reflective component configured to: direct at least a portion of the projection of the depth sensor, direct at least a portion of a field of view of the first visible light sensor, direct at least a portion of a field of view of the second visible light sensor, or any combination thereof.

Example 10 includes the system of any combination of examples 1-9. The depth sensing module is configured to be disposed on an edge of the display.

Example 11 is a method. The wireless charging device may include detecting, via a depth sensing module, a physical object at a plane of a display, detecting, via the depth sensing module, a reflection of the physical object at the plane of the display, identifying, via an interaction module to, an interaction of the physical object with the display based on a meeting point of the detected physical object and the detected reflection.

Example 12 includes the method of example 11, the method further comprising: illuminating the physical object and the reflection of the physical object via an infrared emitter, and detecting a location of the interaction with respect to the infrared emitter.

Example 13 includes the method of any combination of examples 11-12. This example includes enhancing, via a visible light sensor, the identification of the interaction by detecting the physical object and the reflection of the physical object in a light spectrum that is different from a light spectrum capability of the infrared emitter.

Example 14 includes the method of any combination of examples 11-13. The visible light sensor is a first visible light sensor. This example includes enhancing, via a second visible light sensor, location detection of the interaction by triangulation of image data captured by the first visible light sensor and image data captured by the second visible light sensor.

Example 15 includes the method of any combination of examples 11-14. The first visible light sensor and the second visible light sensor are configured to be disposed at different locations at an edge of the display.

Example 16 includes the method of any combination of examples 11-15. This example includes reducing, via the first and second visible light sensors, a potential error in identifying the interaction caused by an occlusion of the physical object by another physical object.

Example 17 includes the method of any combination of examples 11-16. This example includes detecting, via a calibration disruption module, movement of the infrared emitter, the first visible light sensor, the second visible light sensor, or any combination thereof.

Example 18 includes the method of any combination of examples 11-17. The display is configured to emit light in a direction of propagation, and wherein the depth sensor, the first visible light sensor, the second visible light sensor, or any combination thereof, are configured to face the direction of propagation of light emitted from the display.

Example 19 includes the method of any combination of examples 11-18. This example includes directing at least a portion of the projection of the depth sensor via a reflective component, directing at least a portion of a field of view of the first visible light sensor via the reflective component, directing at least a portion of a field of view of the second visible light sensor via the reflective component, or any combination thereof.

Example 20 includes the method of any combination of examples 11-19. This example includes disposing the depth sensing module on an edge of the display.

Example 21 is a computer readable medium including code, when executed, to cause a processing device to: detect a physical object at a plane of a display, detect a reflection of the physical object at the plane of the display, and identify an interaction of the physical object with the display based on a meeting point of the detected physical object and the detected reflection.

Example 22 includes the computer readable medium of example 21, the method further comprising: illuminate the physical object and the reflection of the physical object via an infrared emitter, and detect a location of the interaction with respect to the infrared emitter.

Example 23 includes the computer readable medium of any combination of examples 21-22. This example includes code, when executed, to cause the processing device to enhance, via a first visible light sensor, the identification of the interaction by detecting the physical object and the reflection of the physical object in a light spectrum that is different from a light spectrum capability of the infrared emitter.

Example 24 includes the computer readable medium of any combination of examples 21-23. The visible light sensor is a first visible light sensor. This example includes code, when executed, to cause the processing device to enhance, via a second visible light sensor, location detection of the interaction by triangulation of image data captured by the first visible light sensor and image data captured by the second visible light sensor Example 25 includes the computer readable medium of any combination of examples 21-24. The first visible light sensor and the second visible light sensor are configured to be disposed at different locations at an edge of the display.

Example 26 includes the computer readable medium of any combination of examples 21-25. This example includes code, when executed, to cause the processing device to reduce, via the first and second visible light sensors, a potential error in identifying the interaction caused by an occlusion of the physical object by another physical object.

Example 27 includes the computer readable medium of any combination of examples 21-26. This example includes code, when executed, to cause the processing device to detect, via a calibration disruption module, movement of the infrared emitter, the first visible light sensor, the second visible light sensor, or any combination thereof.

Example 28 includes the computer readable medium of any combination of examples 21-27. The display is configured to emit light in a direction of propagation, and wherein the depth sensor, the first visible light sensor, the second visible light sensor, or any combination thereof, are configured to face the direction of propagation of light emitted from the display.

Example 29 includes the computer readable medium of any combination of examples 21-28. This example includes code, when executed, to cause the processing device to: direct at least a portion of the projection of the depth sensor via a reflective component, direct at least a portion of a field of view of the first visible light sensor via the reflective component, direct at least a portion of a field of view of the second visible light sensor via the reflective component, or any combination thereof.

Example 30 includes the computer readable medium of any combination of examples 21-29. The depth sensing module on an edge of the display.

Example 31 is a method. The wireless charging device may include detecting, via a means for depth sensing, a physical object at a plane of a display, detecting, via the means for depth sensing, a reflection of the physical object at the plane of the display, identifying, via an interaction module to, an interaction of the physical object with the display based on a meeting point of the detected physical object and the detected reflection.

Example 32 includes the method of example 31, the method further comprising: illuminating the physical object and the reflection of the physical object via an infrared emitter, and detecting a location of the interaction with respect to the infrared emitter.

Example 33 includes the method of any combination of examples 31-32. This example includes enhancing, via a visible light sensor, the identification of the interaction by detecting the physical object and the reflection of the physical object in a light spectrum that is different from a light spectrum capability of the infrared emitter.

Example 34 includes the method of any combination of examples 31-33. The visible light sensor is a first visible light sensor. This example includes enhancing, via a second visible light sensor, location detection of the interaction by triangulation of image data captured by the first visible light sensor and image data captured by the second visible light sensor.

Example 35 includes the method of any combination of examples 31-34. The first visible light sensor and the second visible light sensor are configured to be disposed at different locations at an edge of the display.

Example 36 includes the method of any combination of examples 31-35. This example includes reducing, via the first and second visible light sensors, a potential error in identifying the interaction caused by an occlusion of the physical object by another physical object.

Example 37 includes the method of any combination of examples 31-36. This example includes detecting, via a calibration disruption module, movement of the infrared emitter, the first visible light sensor, the second visible light sensor, or any combination thereof.

Example 38 includes the method of any combination of examples 31-37. The display is configured to emit light in a direction of propagation, and wherein the depth sensor, the first visible light sensor, the second visible light sensor, or any combination thereof, are configured to face the direction of propagation of light emitted from the display.

Example 39 includes the method of any combination of examples 31-38. This example includes directing at least a portion of the projection of the depth sensor via a reflective component, directing at least a portion of a field of view of the first visible light sensor via the reflective component, directing at least a portion of a field of view of the second visible light sensor via the reflective component, or any combination thereof.

Example 40 includes the method of any combination of examples 31-39. This example includes disposing the means for depth sensing on an edge of the display.

Example 41 is a system, comprising one or more modules at least partially comprising hardware logic. The wireless charging device may include a means for depth sensing to: detect a physical object at a plane of a display, detect a reflection of the physical object at the plane of the display an interaction module to identify an interaction of the physical object with the display based on a meeting point of the detected physical object and the detected reflection.

Example 42 includes the system of example 41. The means for depth sensing may include an infrared emitter configured to: illuminate the physical object and the reflection of the physical object, and detect a location of the interaction with respect to the infrared emitter.

Example 43 includes the system of any combination of examples 41-42. This example includes a visible light sensor to enhance the identification of the interaction by detecting the physical object and the reflection of the physical object in a light spectrum that is different from a light spectrum capability of the infrared emitter.

Example 44 includes the system of any combination of examples 41-43. The visible light sensor is a first visible light sensor. This example includes a second visible light sensor to enhance location detection of the interaction by triangulation of image data captured by the first visible light sensor and image data captured by the second visible light sensor.

Example 45 includes the system of any combination of examples 41-44. The first visible light sensor and the second visible light sensor are configured to be disposed at different locations at an edge of the display.

Example 46 includes the system of any combination of examples 41-45. The first and second visible light sensors are configured to reduce a potential error in identifying the interaction caused by an occlusion of the physical object by another physical object.

Example 47 includes the system of any combination of examples 41-46. This example includes a calibration disruption module configured to detect movement of the infrared emitter, the first visible light sensor, the second visible light sensor, or any combination thereof.

Example 48 includes the system of any combination of examples 41-47. The display is configured to emit light in a direction of propagation, and wherein the depth sensor, the first visible light sensor, the second visible light sensor, or any combination thereof, are configured to face the direction of propagation of light emitted from the display.

Example 49 includes the system of any combination of examples 41-48. This example includes a reflective component configured to: direct at least a portion of the projection of the depth sensor, direct at least a portion of a field of view of the first visible light sensor, direct at least a portion of a field of view of the second visible light sensor, or any combination thereof.

Example 50 includes the system of any combination of examples 41-49. The means for depth sensing is configured to be disposed on an edge of the display.

Example 51 includes a computer readable medium including code, when executed, to cause a processing device to perform the method according to any combination of the systems, methods, devices, of examples 1-50.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising one or more modules at least partially comprising hardware logic, comprising:
a depth sensing module to:
detect a physical object at a plane of a display;
detect a reflection of the physical object in the plane of the display
an interaction module to identify an interaction of the physical object with the display based on a meeting point of the physical object and the reflection of the physical object in the plane of the display.

2. The system of claim 1, wherein the depth sensing module comprises an infrared emitter configured to:
illuminate the physical object and the reflection of the physical object; and
detect a location of the interaction with respect to the infrared emitter.

3. The system of claim 2, further comprising a visible light sensor to enhance the identification of the interaction by detecting the physical object and the reflection of the physical object in a light spectrum that is different from a light spectrum capability of the infrared emitter.

4. The system of claim 3, wherein the visible light sensor is a first visible light sensor, further comprising a second visible light sensor to enhance location detection of the interaction by triangulation of image data captured by the first visible light sensor and image data captured by the second visible light sensor.

5. The system of claim 4, wherein the first visible light sensor and the second visible light sensor are configured to be disposed at different locations at an edge of the display.

6. The system of claim 4, wherein the first and second visible light sensors are configured to reduce a potential error in identifying the interaction caused by an occlusion of the physical object by another physical object.

7. The system of claim 4, further comprising a calibration disruption module configured to detect movement of the infrared emitter, the first visible light sensor, the second visible light sensor, or any combination thereof.

8. The system of claim 4, wherein the display is configured to emit light in a direction of propagation, and wherein the depth sensor, the first visible light sensor, the second visible light sensor, or any combination thereof, are each physically attached to the display and configured to face the direction of propagation of light emitted from the display.

9. The system of claim 8, further comprising a reflective component configured to:
direct at least a portion of the projection of the depth sensor;
direct at least a portion of a field of view of the first visible light sensor;
direct at least a portion of a field of view of the second visible light sensor; or
any combination thereof.

10. The system of claim 1, wherein the depth sensing module is configured to be disposed on an edge of the display.

11. A method, comprising:
detecting, via a depth sensing module, a physical object at a plane of a display;
detecting, via the depth sensing module, a reflection of the physical object in the plane of the display;
identifying, via an interaction module, an interaction of the physical object with the display based on a meeting point of the physical object and the reflection of the physical object in the plane of the display.

12. The method of claim 11, the method further comprising:
illuminating the physical object and the reflection of the physical object via an infrared emitter; and
detecting a location of the interaction with respect to the infrared emitter.

13. The method of claim 12, further comprising enhancing, via a visible light sensor, the identification of the interaction by detecting the physical object and the reflection of the physical object in a light spectrum that is different from a light spectrum capability of the infrared emitter.

14. The method of claim 13, wherein the visible light sensor is a first visible light sensor, further comprising enhancing, via a second visible light sensor, location detection of the interaction by triangulation of image data captured by the first visible light sensor and image data captured by the second visible light sensor.

15. The method of claim 14, wherein the first visible light sensor and the second visible light sensor are configured to be disposed at different locations at an edge of the display.

16. The method of claim 14, further comprising reducing, via the first and second visible light sensors, a potential error in identifying the interaction caused by an occlusion of the physical object by another physical object.

17. The method of claim 14, further comprising detecting, via a calibration disruption module, movement of the infrared emitter, the first visible light sensor, the second visible light sensor, or any combination thereof.

18. The method of claim 14, wherein the display is configured to emit light in a direction of propagation, and wherein the depth sensor, the first visible light sensor, the second visible light sensor, or any combination thereof, are each physically attached to the display and configured to face the direction of propagation of light emitted from the display.

19. The method of claim 18, further comprising:
directing at least a portion of the projection of the depth sensor via a reflective component;
directing at least a portion of a field of view of the first visible light sensor via the reflective component;
directing at least a portion of a field of view of the second visible light sensor via the reflective component; or
any combination thereof.

20. The method of claim 11, further comprising disposing the depth sensing module on an edge of the display.

21. A tangible, non-transitory, computer-readable medium comprising instructions that, in response to execution by a processor, direct the processor to:
detect a physical object at a plane of a display;
detect a reflection of the physical object in the plane of the display; and
identify an interaction of the physical object with the display based on a meeting point of the physical object and the reflection of the physical object in the plane of the display.

22. The computer-readable medium of claim 21, comprising instructions that, in response to execution by a processor, direct the processor to:
illuminate the physical object and the reflection of the physical object via an infrared emitter; and detect a location of the interaction with respect to the infrared emitter.

23. The computer-readable medium of claim 22, comprising instructions that, in response to execution by a processor, direct the processor to:
- enhance, via a first visible light sensor, the identification of the interaction by detecting the physical object and the reflection of the physical object in a light spectrum that is different from a light spectrum capability of the infrared emitter, wherein the visible light sensor is a first visible light sensor;
- enhance, via a second visible light sensor, location detection of the interaction by triangulation of image data captured by the first visible light sensor and image data captured by the second visible light sensor; and
- reduce, via the first and second visible light sensors, a potential error in identifying the interaction caused by an occlusion of the physical object by another physical object.

24. The computer-readable medium of claim 23, comprising instructions that, in response to execution by a processor, direct the processor to detect, via a calibration disruption module, movement of the infrared emitter, the first visible light sensor, the second visible light sensor, or any combination thereof.

25. The computer-readable medium of claim 21, comprising instructions that, in response to execution by a processor, direct the processor to:
- direct at least a portion of the projection of the depth sensor via a reflective component;
- direct at least a portion of a field of view of the first visible light sensor via the reflective component;
- direct at least a portion of a field of view of the second visible light sensor via the reflective component; or
- any combination thereof.

26. The system of claim 1, comprising a reflective component to direct projection and a field of view, wherein the reflective component is a transition metal switchable mirror physically attached to the display.

* * * * *